J. B. STONER.
Life Preserver.
No. 3,232. Reissued Dec. 15, 1868.
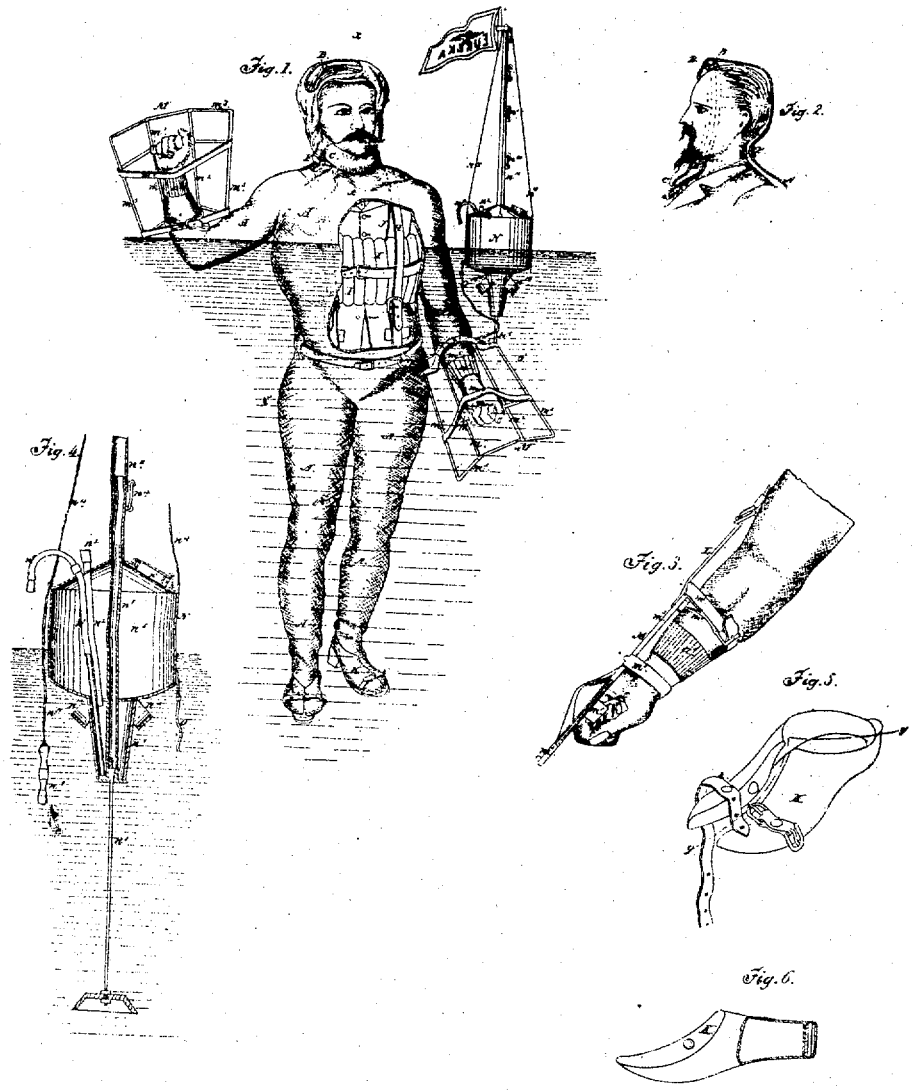
Witnesses.
Theo Turtle
Wm Freeman
Inventor.
Jno B. Stoner
Per Munn & Co
Attorneys United States Patent Office.

JOHN B. STONER, LEOPOLD MENDELSON, AND THEODORE CROMMELIN, OF NEW YORK, N. Y., ASSIGNEES OF JOHN B. STONER.

*Letters Patent No.* 74,168, *dated February* 4, 1868; *reissue No.* 3,232, *dated December* 15, 1868.

IMPROVEMENT IN LIFE-PRESERVING APPARATUS.

The Schedule referred to in these Letters Patent and making part of the same

*To all whom it may concern:*

Be it known that JOHN B. STONER, of the city and county of New York, and State of New York, did invent certain new and useful Improvements in Life-Preserving Apparatus, which improvements were assigned in full to himself, LEOPOLD MENDELSON, and THEODORE CROMMELIN, of the same place, and Letters Patent of the United States, for the same, were issued on the 4th day of February, 1868, in the joint names of STONER, MENDELSON, and CROMMELIN. Now, therefore, we, the said JOHN B. STONER, LEOPOLD MENDELSON, and THEODORE CROMMELIN, do hereby declare that the following is a full, clear, and exact description of said improvements, reference being had to the accompanying drawings, making a part of this specification, in which—

Figure 1 is a perspective view of the improved apparatus as applied to practical use.

Figure 2 is a sectional view of the head-dress, taken through the red line *x x*, fig. 1.

Figure 3 is a view in detail, showing the manner in which the propelling-device is attached to the arms of the wearer.

Figure 4 is a diametrical section of a floating provision and signal-case accompanying the apparatus.

Figure 5 shows one of the hinged weights for the feet.

Figure 6 is a sectional view of the same, taken through line *y y*, fig. 5.

Similar letters of reference indicate corresponding parts in the several figures.

This invention relates to certain new and useful improvements on apparatus which are designed for preserving the lives of persons who are compelled to commit themselves to the water, in case of serious accidents to vessels at sea or on rivers.

This invention provides for covering the entire body, except the face and hands, with a flexible water-proof suit, which will allow a free use of the arms and legs, and prevent the health of a person from being injured by long subjection to water.

It also provides for the use of a float or buoy in conjunction with a water-proof suit, which will serve, in conjunction with a ballasting-apparatus for the feet, to keep a person erect while in the water, and allow him to employ his arms to the best advantage for propulsion.

It also provides for the use of flexible wings, in conjunction with a water-proof covering, a float, and a ballasting-apparatus, which will enable a person to propel himself through the water with safety and great facility.

It also provides for so constructing the water-proof covering that it can be readily applied to a person, so as to cover and protect from water the entire body, except the face and hands, and when applied no water can enter at such points as are exposed, at the same time providing for protecting the face from the splash of the water.

The invention further provides for the use, in conjunction with a swimming-apparatus, of a floating signal-apparatus, which is connected to the former, and so constructed as to serve as a buoy, and also as a provision-chest, for supplying the swimmer with water and food, all as will be hereinafter explained.

To enable others skilled in the art to understand this invention, we will describe its construction and operation.

A is a rubber suit made in one piece, the lower parts or feet being made thicker than the other parts, and in the same manner that rubber shoes are now made. The suit A is made large enough to be put on on over the ordinary clothing of the wearer, his shoes only being removed. The only openings in the suit A are at the upper end or head and at the wrists, for the exposure of the face and hands of the wearer. The openings at the wrists are provided with elastic cuffs or bands, *a'*, made in a piece with the suit, to confine the edges of the openings closely around the wrists of the wearer, to prevent the entrance of water.

To the under side of the edge of that part of the upper or top opening that comes upon the top of the wearer's head is secured an elastic band, B, which we prefer to make tubular in form, and which passes under the chin of the wearer, beneath the chin-flap C.

To the inner edge of the under side of the upper opening is attached an open elastic band, D, which we prefer to make in the form shown in fig. 2; that is to say, formed by connecting two elastic tubes longitudinally with an elastic membrane, so as to leave a space or channel between the two tubular edges of said band.

The band D is buckled over the head of the wearer, and is prevented from slipping forward by an auxiliary band, E, attached to it, and which passes around the back of the head of the wearer, as shown in fig. 2.

The elastic tubular band B is then sprung into place beneath the chin of the wearer, passing, also, beneath the chin-flap C, in such a way as to lie in the space or channel between the tubular edges of the elastic band D, as shown in figs. 1 and 2.

The slack of the upper opening is gathered into a roll, and placed in the hollow between the jaws and neck of the wearer, as shown in fig. 1, where it is confined and secured by a strap, F, secured, in proper position, to the outer side of the suit, and which is buckled around the neck of the wearer.

The flap C projects forward beneath the chin of the wearer, and is intended to protect his mouth and nose from the splash of the water.

The upper or top opening of the suit A must be made so large that the wearer can conveniently insert his body through it.

The suit A is secured to the body of the wearer by a strap, G, secured to the rear part of the suit and buckled around his body.

The suit is still further supported by straps or suspenders, H, secured to the lower part of the body of said suit, and passing over the shoulders of the wearer, as shown in fig. 1.

I is a cork vest or jacket, made by sewing two pieces of canvas, or other suitable material, together, in such a way that, when stuffed with pulverized cork or other suitable material, it may be smooth or flat upon the inside, and corrugated upon the outside, as shown in fig. 1.

The vest or jacket I is worn beneath the rubber suit A, is buckled around the waist of the wearer, and is prevented from slipping down by shoulder-straps, J, passing over the shoulder of the wearer, as shown in fig. 1.

When not in use, the vest I can be folded into a very small bulk.

K are metal shoes or weights, fitting upon the feet, the greater part of the weight (about five pounds) being collected upon the instep. The shoes K are made in two parts, hinged to each other at the heel, for convenience in putting them on, and secured to each other by a strap or straps, $k$, buckled around the said shoes and around the feet of the wearer. The forward parts of the shoes or weights are kept from slipping or working upon each other by one or more dowel-pins or projections, formed upon the edge of the one part and entering holes or cavities in the other part.

The shoes K should be lined or padded upon their inner sides and edges, to prevent them from chafing the wearer, and they should be galvanized or wholly covered with rubber, to prevent the corrosive action of the water.

M is the propelling or swimming-device, in which $m$ is a bar or handle, to be grasped in the hand of the wearer, and to the ends of which are attached the wire bars $m^2$. $m^3$ is a wire frame-work, hinged or pivoted to the bars $m^2$, as shown in fig. 1. The entire frame-work, $m^2$ $m^3$, is covered with rubber, as shown in the drawings.

When the hand, with the device M attached to it, is moved through the water in one direction, the wings fold down, so as to encounter less resistance from the water; but when moved through the water in the other direction, the wings expand into a horizontal position, beyond which they are prevented from passing by the straps $m^4$ and $m^5$. The strap $m^4$ passes beneath the hand or wrist, and its ends are attached to the outer edges of the wings.

$m^6$ is a strap, the middle part of which is attached to the under side of the upper end of the middle part of the device M, and which buckles around the arm of the wearer, to secure the upper part of said device to the arm.

The outer ends of the straps $m^5$ are attached to the outer edges of the upper parts of the wings, and their inner ends are secured to the strap $m^6$, near the point at which it is buckled; or, if desired, the straps $m^5$ may be made in one piece, passing beneath the arm, and having it ends secured to the outer edges of the said wings.

L is a cord or strap, attached to the upper part of the device M, and to the sleeve of the suit A, so that the said device, when detached from the hand, and allowed to float upon the water, cannot float away and be lost.

Accompanying this swimming-apparatus, and fastened to the belt G by a cord, O, is a hollow vessel, N, which, being made air-tight, serves as a float or buoy. This vessel may be made of any suitable shape, but the shape represented in the drawings, figs. 1 and 4, is found to be best adapted for the purpose. This vessel is cylindrical, with conical ends, its bottom end having a central depressed vessel, $n^1$, formed on it, for containing water for supplying thirst. As this vessel $n^1$ does not communicate with the vessel N, water is supplied to it through pipe $n^2$, and drawn from it through the pipe $n^3$, which is provided with a flexible external section, $n^4$, and a suitable mouth-piece.

The water-vessel $n^1$ being applied to the bottom of the vessel N, it will be submerged in the water, and its contents preserved cool.

The main vessel or buoy, N, is designed for containing provisions, and access can be had to its interior through an opening in its top, which is closed by a tightly-fitting cap, $n^6$.

A tube, $n^7$, is constructed in the vertical centre of the vessels N $n^1$, which forms an opening through these two vessels, as shown in fig. 4. Through this tube a rod, $n^8$, is passed, carrying on its lower end a weight, for the purpose of ballasting the vessels. The upper end of this rod $n^8$ is enlarged, so that it will not drop through the contracted orifice at the lower end of tube $n^7$, and upon this enlarged end a male screw is formed, for receiving upon it a floating-handle portion, $n^9$, when the rod $n^8$ is pushed up as far as it will go.

On top of the vessel N, and in the centre thereof, is erected a flag-staff, $n^{11}$, which is made of telescopic sections, which, when the apparatus is not in immediate use, may be introduced one within the other, and confined in place by the rod $n^8$ and floating-handle $n^9$, as above described.

The guy-ropes $n^{13}$ and loops $n^{12}$ will keep the staff in a steady position when erected.

This staff is designed for carrying at its head a flag, a light, or other suitable signal. By having it thus elevated, it can be seen by persons at a distance, and relief thereby afforded to the swimmer.

The handles $n^{14}$, which are applied to the water-vessel $n^1$, are designed to serve as means for taking hold of the vessels, in case they should be required to serve temporarily as a life-preserver.

These handles will also enable a person to grasp and steady the vessels, while in the water, for the purpose of drinking from pipe $n^4$, or supplying himself with provisions.

It will be seen, from the above description, that every means is offered for saving the life of a person who is compelled to resort to the water for safety, and every means possible is provided for the comfort of a person in such an event.

The covering A will protect his body from the bad effects of the water, and the flap C will prevent water from splashing into his face; the floating-jacket I will prevent him from sinking, and keep his head and shoulders sufficiently far above the surface of the water to enable him to use his arms; the loaded shoes K will keep him upright, and enable him to move through the water, by the exercise of his arms, with the propelling-devices M; and the floating signal and provision-chest will furnish him with means for sustaining life for a long period of time, and also serve as a means for signalizing for assistance.

We are aware that it is not new to make flexible water-proof suits or dresses.

What we claim as our invention, and desire to secure by Letters Patent, is—

1. A life-preserving apparatus, consisting of a swimming-suit and a floating provision-chest, substantially as described.

2. An elastic tubular head-band, applied to the head-dress of a swimming-suit, substantially in the manner described.

3. Providing a water-proof suit with a chin-flap, C, substantially as described.

4. The combination of head-bands B D E F, and elastic cuffs $a'$, with a water-proof flexible suit, of the description herein set forth, and made in one piece, with openings for the face and hands, substantially as described.

5. The combination of arm-propellers M, or their equivalents, a float, I, ballasting-shoes K, and a water-proof covering, A, constructed substantially as described for the purpose set forth.

6. The flexible propellers M, adapted for being applied o the arms, and constructed substantially as described.

7. The hinged ballasting-shoes K, when constructed and arranged substantially as described.

JOHN B. STONER.
LEOPOLD MENDELSON.
THEODORE CROMMELIN.

Witnesses:
N. GANO DUNN,
WILLIAM STAINTON.